US010223457B2

(12) United States Patent
Kruglick

(10) Patent No.: US 10,223,457 B2
(45) Date of Patent: Mar. 5, 2019

(54) IDENTIFICATION OF DISTRIBUTED USER INTERFACE (DUI) ELEMENTS

(71) Applicant: Empire Technology Development LLC, Wilmington, DE (US)

(72) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 405 days.

(21) Appl. No.: 14/370,436

(22) PCT Filed: Oct. 2, 2013

(86) PCT No.: PCT/US2013/063136
§ 371 (c)(1),
(2) Date: Jul. 2, 2014

(87) PCT Pub. No.: WO2015/050543
PCT Pub. Date: Apr. 9, 2015

(65) Prior Publication Data
US 2015/0106356 A1    Apr. 16, 2015

(51) Int. Cl.
*G06F 17/30* (2006.01)
(52) U.S. Cl.
CPC .............. *G06F 17/30867* (2013.01)
(58) Field of Classification Search
CPC ................................................. G06F 17/30867
USPC .................. 707/805, 790; 715/769; 709/203
See application file for complete search history.

(56) References Cited

U.S. PATENT DOCUMENTS

| 7,137,126 B1* | 11/2006 | Coffman ........... G06F 17/30899 704/200 |
| 8,978,139 B1* | 3/2015 | Banerjee ............. H04L 63/1416 726/24 |
| 2004/0154000 A1 | 8/2004 | Kasravi et al. |
| 2006/0036745 A1* | 2/2006 | Stienhans ................. G06F 8/38 709/228 |
| 2006/0080302 A1 | 4/2006 | Schrepp et al. |

(Continued)

OTHER PUBLICATIONS

"Gears Graphical Path Filter," Accessed at http://web.archive.org/web/20120621064313/http://www.siafoo.net/snippet/178, Accessed on Jul. 1, 2014, pp. 3.

(Continued)

*Primary Examiner* — Syling Yen

(57) ABSTRACT

Technologies are generally described to develop and implement a searchable knowledge source to identify distributed user interface (DUI) elements. In some examples, a DUI identification system may receive a control record of an application and populate one or more searchable knowledge sources based on an application description retrieved. The application description may include keywords, input elements, and output elements, and the searchable knowledge sources may be generated from control records of a multitude of applications. The DUI identification system may execute a query on the searchable knowledge sources based on the received keywords, input elements, and output elements associated with a target workflow from a requesting client. A query result that includes one or more DUI elements may be provided to the requesting client. The DUI elements may connect the input elements to corresponding output elements and match the keywords associated with the target workflow.

15 Claims, 6 Drawing Sheets

(56) References Cited

U.S. PATENT DOCUMENTS

| | | | |
|---|---|---|---|
| 2008/0082535 A1* | 4/2008 | Eigemann | G06F 8/38 |
| 2008/0134071 A1* | 6/2008 | Keohane | G06F 3/038 |
| | | | 715/769 |
| 2008/0201453 A1* | 8/2008 | Assenmacher | G06F 11/3664 |
| | | | 709/219 |
| 2011/0072046 A1 | 3/2011 | Chi | |
| 2013/0212160 A1* | 8/2013 | Lawson | G05B 19/4185 |
| | | | 709/203 |
| 2013/0290369 A1* | 10/2013 | Sayers | H04L 67/22 |
| | | | 707/769 |

OTHER PUBLICATIONS

"How NodeBox Works," Accessed at http://web.archive.org/web/20130926090642/http://nodebox.net/node/documentation/concepts/concepts.html, Accessed on Jul. 1, 2014, pp. 9.

"Meet NodeBox 3," Accessed at http://web.archive.org/web/20130926114103/http://nodebox.net/node, Accessed on Jul. 1, 2014, pp. 3.

"Node Reference," Accessed at http://web.archive.org/web/20130922093101/http://nodebox.net/node/reference, Accessed on Jul. 1, 2014, pp. 5.

"NodeBox for OpenGL," Accessed at http://web.archive.org/web/20131005183132/http://www.cityinabottle.org/nodebox, Accessed on Jul. 1, 2014, pp. 16.

International Search Report and Written Opinion for International Patent Application No. PCT/US2013/63136, dated Apr. 25, 2014.

Luyten, K. and Coninx, K., "Distributed User Interface Elements to support Smart Interaction Spaces," Seventh IEEE International Symposium on Multimedia, Dec. 12-14, 2005, pp. 8.

Melchior, J. et al., "A Model-Based Approach for Distributed User Interfaces," EICS, Jun. 13-16, 2011, pp. 9.

Pappas, A., "Distilling market noise into market sense," Accessed at http://web.archive.org/web/20130530045335/http://www.visionmobile.com/blog/2012/12/the-changing-landscape-of-app-discovery/, Accessed on Jul. 1, 2014, pp. 14.

Rädle, R. et al., "TwisterSearch: A Distributed User Interface for Collaborative Web Search," CHI'12, May 5-10, 2012, pp. 4.

Rodriguez-Mier, P. et al., "Automatic Web Service Composition with a Heuristic-Based Search Algorithm," IEEE International Conference on Web Services (ICWS), pp. 81-88 (2011).

Wang, B. et al., "Generating Workflow Models from OWL-S Service Descriptions with a Partial-Order Plan Construction," IEEE International Conference on Web Services (ICWS), pp. 714-715, (2011).

* cited by examiner

COMPUTER PROGRAM PRODUCT 600

SIGNAL-BEARING MEDIUM 602

604 AT LEAST ONE OF
 ONE OR MORE INSTRUCTIONS FOR RECEIVING A CONTROL RECORD OF A SOURCE APPLICATION;
 ONE OR MORE INSTRUCTIONS FOR RETRIEVING AN APPLICATION DESCRIPTION ASSOCIATED WITH THE SOURCE APPLICATION;
 ONE OR MORE INSTRUCTIONS FOR POPULATING ONE OR MORE SEARCHABLE KNOWLEDGE SOURCES BASED ON THE APPLICATION DESCRIPTION ;
 ONE OR MORE INSTRUCTIONS FOR RECEIVING KEYWORDS, INPUT ELEMENTS, AND OUTPUT ELEMENTS ASSOCIATED WITH A TARGET WORKFLOW;
 ONE OR MORE INSTRUCTIONS FOR EXECUTING A QUERY ON THE SEARCHABLE KNOWLEDGE SOURCE WITH QUERY TERMS BASED ON  THE KEYWORDS, THE INPUT ELEMENTS, AND THE OUTPUT ELEMENTS; AND
 ONE OR MORE INSTRUCTIONS FOR PROVIDING A QUERY RESULT TO A REQUESTING CLIENT, THE QUERY RESULT INCLUDING ONE OR MORE DUI ELEMENTS ASSOCIATED WITH THE QUERY TERMS.

| COMPUTER-READABLE MEDIUM 606 | RECORDABLE MEDIUM 608 | COMMUNICATIONS MEDIUM 610 |

FIG. 6

IDENTIFICATION OF DISTRIBUTED USER INTERFACE (DUI) ELEMENTS

CROSS-REFERENCE TO RELATED APPLICATION

This Application is the U.S. National Stage filing under 35 U.S.C. § 371 of International Application No. PCT/US13/63136, filed Oct. 2, 2013. International Application No. PCT/US13/63136 is hereby incorporated by reference in its entirety.

BACKGROUND

Unless otherwise indicated herein, the materials described in this section are not prior art to the claims in this application and are not admitted to be prior art by inclusion in this section.

Web pages and applications are largely identified through implementation of web search engines and application search engines, respectively. However, techniques to identify distributed user interface (DUI) elements have not received much attention, specifically how a client may identify DUI elements with which they may want to populate their personal devices, widget panels, web pages, and the like.

A prevalent feature of a DUI system is the ability to link together multiple DUI elements so that a control panel and/or a collection can perform actions that a single application may not be able accomplish alone, such as by remotely operating multiple applications. For example, a user may set up an image processing macro to paste and modify a picture in an image processing program and then export a button via a DUI add-on, an operating system (OS) function, or an overlay framework. A user may then group the button with another button that captures an image (for example, from a hardware camera or a web page) and copy the other button to the clipboard. Using both buttons may enable the user to effectively capture an image from a first source using a first interface element, deliver the image as a source to a second interface element, and transpire with the output from the second interface element. However, without pre-loading or similar identification of various DUI elements, the user may not be able to find, implement, and link different DUI elements suitable for particular scenarios based on device configurations, network connections, application types, etc.

SUMMARY

The present disclosure generally describes techniques to identify distributed user interface (DUI) elements through development and implementation of a searchable knowledge source.

According to some examples, a method to develop a searchable knowledge source for identification of distributed user interface (DUI) elements is provided. An example method may include receiving a control record of a source application and retrieving an application description associated with the source application. The method may further include populating one or more searchable knowledge sources based on the application description.

According to other examples, a method to identify distributed user interface (DUI) elements through a searchable knowledge source is provided. An example method may include receiving keywords, input elements, and output elements associated with a target workflow. The method may also include executing a query on the searchable knowledge source with query terms based on the received keywords, input elements, and output elements, where the searchable knowledge source may be generated from control records of a plurality of applications. The method may further include providing a query result to a requesting client, the query result including one or more DUI elements associated with the query terms.

According to further examples, a server to develop a searchable knowledge source for identification of distributed user interface (DUI) elements is described. An example server may include a memory and a processor coupled to the memory, the processor executing a knowledge source application. The knowledge source application may be configured to receive a control record of a source application and retrieve an application description associated with the source application. The knowledge source application may also be configure to populate one or more searchable knowledge sources with keywords, input elements, and output elements obtained from the application description associated with the source application.

According to some embodiments, a server to identify distributed user interface (DUI) elements through a searchable knowledge source is described. An example server may include a memory and a processor coupled to the memory, the processor executing a search application. The search application may be configured to receive keywords, input elements, and output elements associated with a target workflow. The search application may also be configured to execute a query on the searchable knowledge source with query terms based on the received keywords, input elements, and output elements, where the searchable knowledge source may be generated from control records of a plurality of applications. The search application may be further configured to provide a query result to a requesting client, the query result including one or more DUI elements associated with the query terms.

According to other embodiments, a computer-readable memory device with instructions stored thereon is described, which when executed on one or more computing devices may execute a method to develop a searchable knowledge source implemented to identify distributed user interface (DUI) elements. The method may be similar to the example method to develop a searchable knowledge source implemented to identify distributed user interface (DUI) elements discussed above.

According to further embodiments, a computer-readable memory device with instructions stored thereon is described, which when executed on one or more computing devices may execute a method to identify distributed user interface (DUI) elements through implementation of a searchable knowledge source. The method may be similar to the example method to identify distributed user interface (DU) elements through implementation of a searchable knowledge source as discussed above.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 6 illustrates a block diagram of an example computer program product, all arranged in accordance with at least some embodiments described herein.

DETAILED DESCRIPTION

Figure 1:
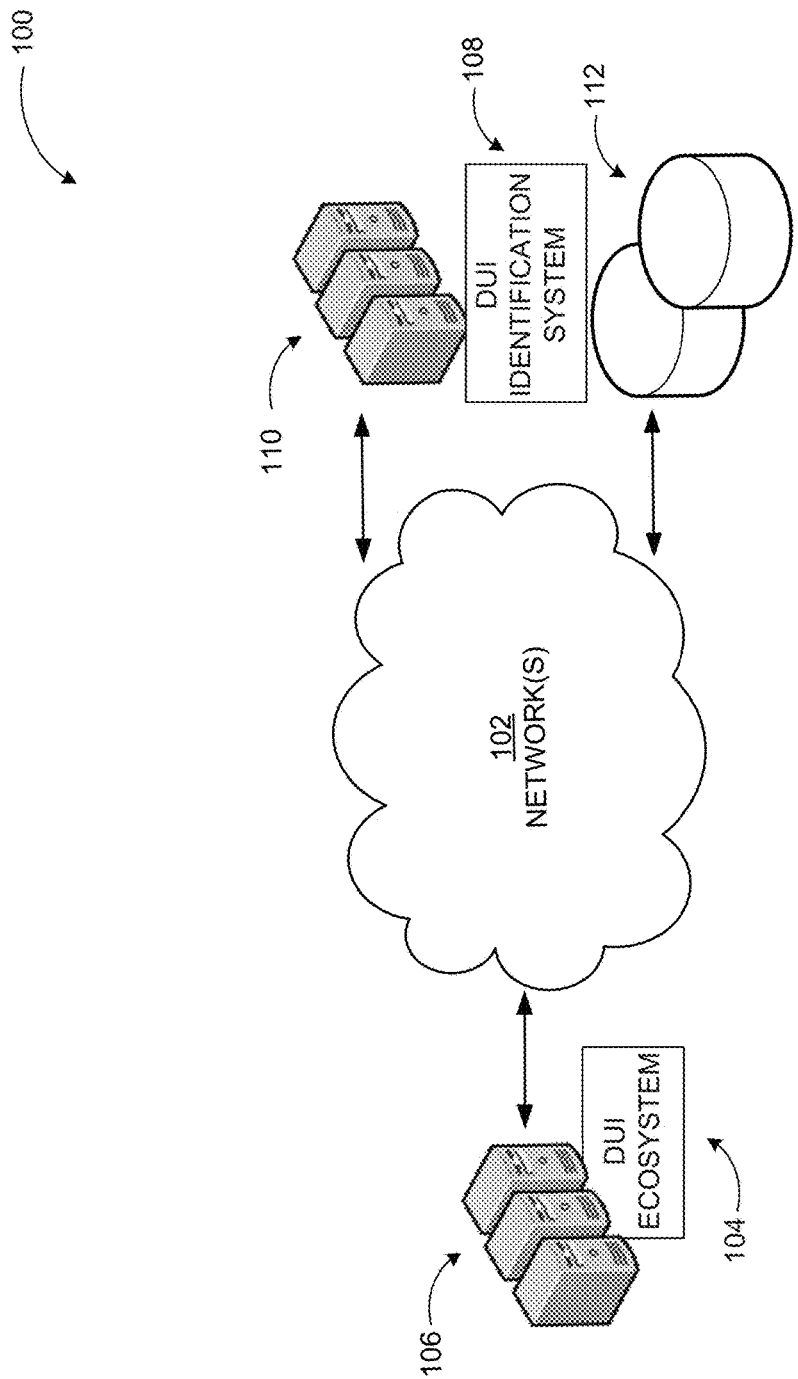
FIG. 1 illustrates an example network environment in which a searchable knowledge source may be implemented to identify distributed user interface (DU) elements.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to identification of distributed user interface (DUI) elements through a searchable knowledge source.

Briefly stated, technologies are generally described to develop and implement a searchable knowledge source to identify DUI elements. In some examples, a DUI identification system may receive a control record of an application and populate one or more searchable knowledge sources based on an application description. The application description may include keywords, input elements, and output elements, and the searchable knowledge sources may be generated from control records of a multitude of applications. The DUI identification system may execute a query on the searchable knowledge sources based on the received keywords, input elements, and output elements associated with a target workflow from a requesting client. A query result that includes one or more DUI elements may be provided to the requesting client. The DUI elements may connect the input elements to corresponding output elements and match the keywords associated with the target workflow.

A control record of an application, as described herein, may include an identity of the application and control information associated with the application. The control information may include a description of how controls connect as producers, consumers, adopters, and developers to implement application control serving. The control record may also include icon targets in the application (for example, a button) and command formatting.

An input element, as described herein, may be a first interface element from a first application or the first application itself. The output element, as described herein, may be a final interface element produced within the first application or a final application following delivery of the first interface element from the first application. The output element may also be the final application itself. The input element and the output element may specify a data format including a media stream, an extensible markup language (XML) format, a uniform resource locator (URL), a keg, a graphical format, file format, text, hypertext markup language (HTML), a tuple and/or one or more controls linked to a served control. Alternately, the input elements and output elements may identify a first application and a final application, if data formats are not known.

A workflow, as described herein, may be a sequence of one or more actions enabled by a control panel and/or a collection of one or more compatible DUI elements that are or may be linked together. A workflow may be defined by identifying an input element that may be fed into the workflow to transpire a particular output element. For example, a workflow may capture a photo at a first application and deliver the photo to a second application to transpire a home video. The input element may be a jpeg from a camera application and the output element may be a media stream from a home video application.

A DUI identification system, as described herein, may include one or more servers and one or more searchable knowledge sources, where a searchable knowledge source may be a database, a data cube, a key-value store, table(s), or comparable data store. The one or more servers may be configured to execute a knowledge source application configured to receive control records, retrieve application descriptions, and populate the searchable knowledge sources. The servers may also be configured to execute a search application to receive keywords, input elements, and output elements from a requesting client, execute a query, and provide a query result to the client.

FIG. 1 illustrates an example network environment in which a searchable knowledge source may be implemented to identify am elements, arranged in accordance with at least some embodiments described herein.

As shown in a diagram 100, a network 102 may host a DUI ecosystem 104 and a DUI identification system 108. The DUI ecosystem 104 may include one or more servers 106. The DUI identification system 108 may include one or more servers 110 and one or more searchable knowledge sources 112. The DUI ecosystem 104 may be coupled to a source application and a served control as shown below in FIG. 2.

The network 102 may comprise any topology of servers, clients, Internet service providers, and communication media, where the topology may be static or dynamic. The network 102 may include secure networks such as an enterprise network, an unsecure network such as a wireless open network, or the Internet. The network 102 may also coordinate communication over other networks such as Public Switched Telephone Network (PSTN) or cellular networks. Furthermore, the network 102 may include short range wireless networks such as Bluetooth or similar ones. By way of example, and not limitation, the network 102 may include wireless media such as acoustic, radio frequency (RF), infrared and other wireless media.

The servers 110 of the DUI identification system 108 may receive a control record of the source application from the DUI ecosystem 104 through a knowledge source application executed by the servers 110. The control record may include an identity and control information associated with the source application, where a monitor within the DUI ecosystem 104 may observe the control information to provide data for the control record.

Within the DUI identification system 108, the knowledge source application may retrieve an application description associated with the source application using the control record. The application description may be retrieved by submitting a query to a search engine, by accessing data on a device hosting the source application, or by performing comparable text search approaches based on information retrieved form the control record such as application name, file name, etc. For example, the application description may be retrieved by submitting a query, with the camera application as a query term, to an existing search engine to retrieve data on the camera application. The data may include functions of the application, how the application may interact with other applications, descriptions of functions or uses, input elements and output elements of the applications, and the like. In another example, data on a mobile device hosting a camera application may be accessed to retrieve information, such as which one or more other applications on the mobile device have been compatible with the camera application. Information may further include which output elements of the camera application were an input element of the other applications enabling compatibility. The application description may include keywords, input elements, and output elements associated with the source application. The knowledge source application may then populate the searchable knowledge sources 112 based on the application description, where the searchable knowledge sources 112 may include a database or a data cube or the like. The searchable knowledge sources 112 may be generated from control records of a multitude of source applications enabling implementation of the searchable knowledge sources 112 to identify DUI elements through execution of a search application.

Current web search engines and application search engines are generally keyword based. Thus, further population of searchable knowledge sources with input elements and output elements along with keywords may enable easier identification and selection of DUI elements compared to current search engine techniques for non-technical users and the DUI ecosystem may be enhanced.

In an example scenario, for a target workflow, a user may want to use a graphics system on a mobile device to apply repeatedly a single function that writes text along a path without having to install a large application for the graphics system on the mobile device. An input element may be line detection in a captured photo and an output element may be text written along a curve in the captured photo.

In a conventional system, the user may have to capture the photo with the mobile device, deliver the photo to a desktop computer, and am a computer vision program that detects e shapes. One or more of those lines may be fed into a graphics application to apply a tool that writes text along the lines. The completed photo with text may then be returned to the mobile device for use in social network applications, emailing, and the like.

In a system according to example embodiments, the user may provide keywords, input elements, and output elements associated with the target workflow, such as the example elements described above, to a search application executed by a server of the DUI identification system 108. A query engine of the DUI identification system 108 may execute a query through the search application based on the keywords, input elements, and output elements associated with the target workflow to provide a query result including one or more DUI elements to the mobile device. Furthermore, compatible DUI elements may be linked together enabling the mobile device to assemble a control panel to achieve the target workflow. In response to the user selecting one or more of the DUI elements provided in the query result to populate the mobile device, the DUI identification system 108 may provide information to implement the selected DUI elements or automatically implement the selected DUI elements on the mobile device. As a result, the user may achieve the entire target workflow on the mobile device without having to install the large application for the graphics system. In another example the large applications may be installed and the user may be insulated from the complexity of the application by being presented with a limited interface element as part of their workflow.

Figure 2:
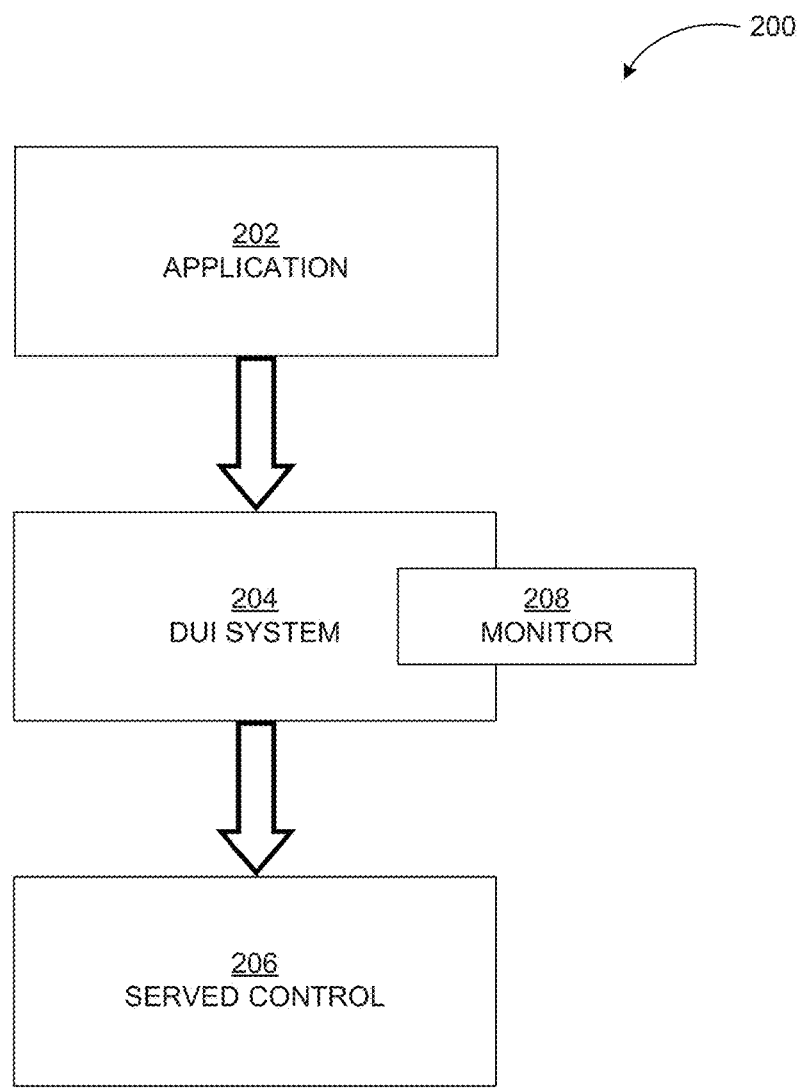
FIG. 2 illustrates an example DUI ecosystem.

FIG. 2 illustrates an example DUI ecosystem, arranged in accordance with at least some embodiments described herein.

As shown in a diagram 200, an example DUI ecosystem may include a source application 202, a DUI system 204, and a served control 206. A monitor 208 may be located in the DUI system 204, as illustrated, the source application 202, or the served control 206. In some embodiments, the monitor 208 may not be needed as the DUI system 204 may be configured to perform the monitor's actions. The source application 202 may be a desktop application, a web page element, a web application, a packaged application, a ubiquitous computing (ubicomp) device service, and/or a user interface element that is isolated by the DUI system 204. The am system 204 may be browser based, operating system (OS) based, and/or a specific DUI application that is activated to access one or more DUI elements.

The monitor 208 may be configured to observe control information associated with the source application 202 to provide data for a control record of the source application 202. The control information may include a description of how controls connect as producers, consumers, adopters, and developers to implement application control serving. The control record may also include an identity of the source application 202, as well as icon targets in the source application 202 (for example, a button) and command formatting. The monitor 208 may provide the control record of the source application 202 to a DUI identification system through a knowledge source application executed by one or more servers of the DUI identification system. The knowledge source application may retrieve an application description and populate the one or more searchable knowledge sources based on the application description. The application description may include keywords, input elements, and output elements associated with the source application 202. In some examples, the knowledge source application may then provide the control record of the source application 202 back to the DUI system 204, where the control record may include implementation information for use of the DUI system 204. The searchable knowledge sources may then be implemented to identify DUI elements through execution of a query.

For example, a query engine of the DUI identification system may execute a query on the searchable knowledge sources through the search application when a requesting client may want to assemble a control panel to achieve a target workflow or a goal. The client may already have one or more applications to use in the control panel and/or input and output elements to use, but additional components may be needed to get from one application to another or from an input form to an output form. The client may assemble the control panel for personal tasks, such as modifying photos and sending them to social media, and/or for professional tasks, such as enterprise tasks.

Example embodiments may enable identification and implementation of DUI elements into the target workflow that a less technically oriented user may otherwise not know about. Without a specific identification system for DUI elements, the user may have to make an uninformed pick of a program they know performs a particular function. The user may then attempt to manipulate the program with DUI frameworks and tricks to enable the function to be compatible with other toots and/or functions of the same program or a different program the user knows about. Embodiments may enable identification of existing DUI elements compatible to functions within the target workflow by connecting input elements to corresponding output elements, and implementation of the DUI elements in an informed and guided manner through the DUI identification system.

Figure 3:
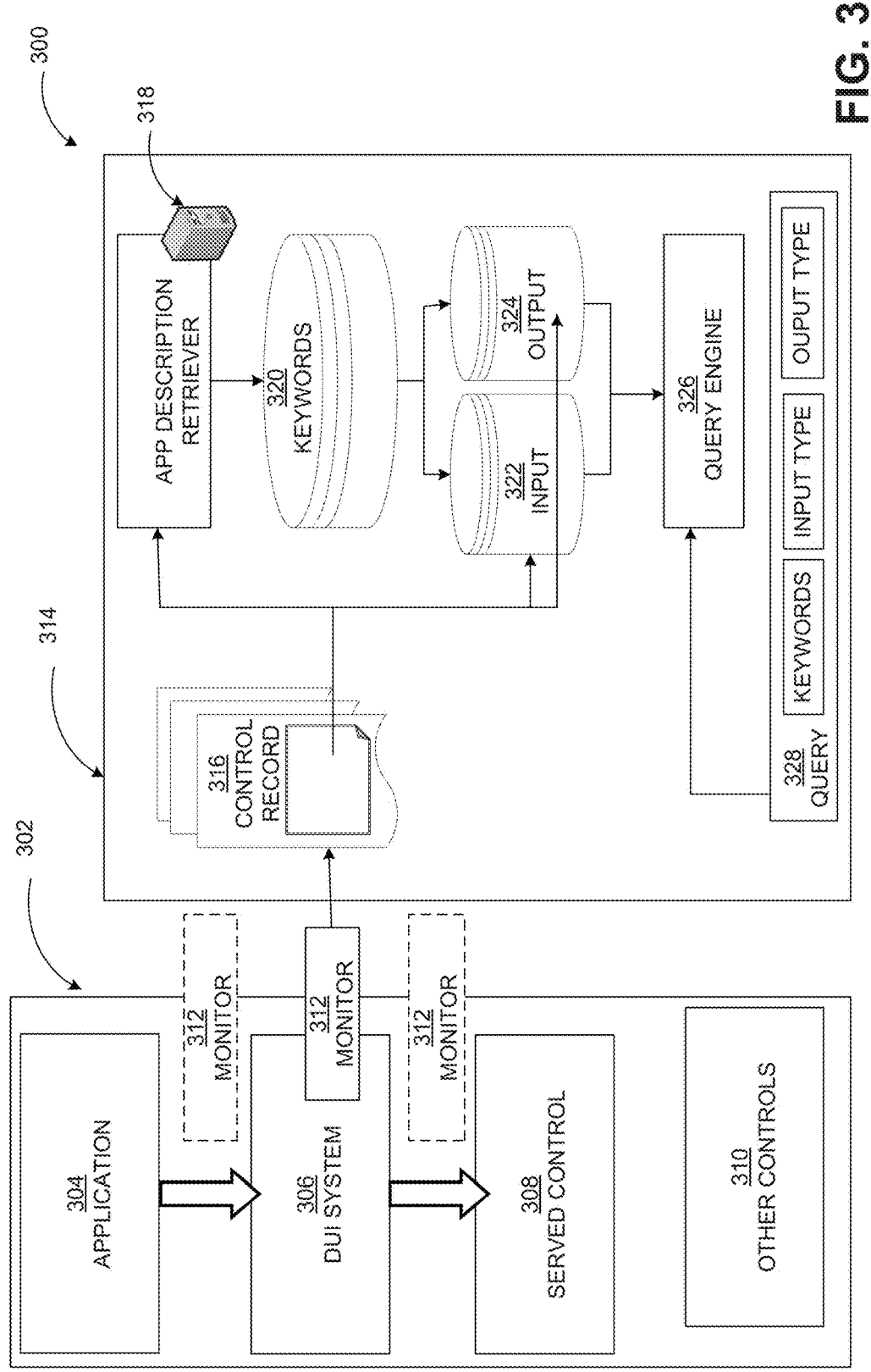
FIG. 3 illustrates an example system to identify DUI elements.

FIG. 3 illustrates an example system to identify DUI elements, arranged in accordance with at least some embodiments described herein.

As shown in a diagram 300, a DUI ecosystem 302 may include a source application 304, a DUI system 306, a served control 308, and other controls 310. A monitor 312 may be within the DUI system 306, the source application 304, the served control 308, or as part of the interface between elements as illustrated. A DUI identification system 314 may include one or more servers for example, a server 318) configured to execute a knowledge source application and a search application, one or more searchable knowledge sources 320, 322, 324, and a query engine 326.

The monitor 312 may be configured to observe control information associated with the source application 304 to provide data for a control record 316 of the source application 304. In some embodiments, the monitor may not be present, and the DUI system 306 may be configured to observe the control information. The control record 316 may include an identity of the source application 304 and the control information observed by the monitor 312 and/or the DUI system 306. The control information may include a description of how controls connect as producers, consumers, adopters, and developers to implement application control serving. The control record may also include icon targets in the source application 304 (for example, a button) and command formatting.

The DUI identification system 314 may receive the control record 316 from the monitor 312 and/or the DUI system 306 through the knowledge source application executed by the server 318. The control record 316 may include description of technical parameters, and keywords may come from a search engine by looking for the application name or file name, for example, from the control record. The search may yield keywords, input elements, and output elements associated with the source application 304. The knowledge source application may retrieve the application description by submitting a query to a search engine, by accessing data on a device hosting the source application 304, or by performing other text search techniques.

The knowledge source application may populate the searchable knowledge sources 320, 322, 324 based on the application description. For example, the knowledge source application may populate searchable knowledge source 320 based on keywords, searchable knowledge source 322 based on input elements, and searchable knowledge source 324 based on output elements from the application description associated with the source application 304. In some examples, the knowledge source application may then provide the control record of the source application 304 back to the DUI system 306, where the control record includes implementation information for client use of the DUI system 306.

The DUI identification system 314 may receive keywords, input elements, and/or output elements associated with a target workflow from a requesting client through the search application executed by the servers. A query 328 may then be executed on the searchable knowledge sources 320, 322, 324 by the query engine 326, with query terms based on the received keywords, input elements, and/or output elements associated with the target workflow. A query result including one or more DUI elements associated with the query terms may be provided to the requesting client through the search application. The query result may specifically provide DUI elements that connect the input elements with corresponding output elements and match the keywords associated with the target workflow to the requesting client. The DUI elements may be associated with web applications, open source applications, and/or device software. In response to the selection of one or more of the DUI elements provided from the query result, the DUI identification system 314 may provide information to implement the selected DUI elements or automatically implement the selected DUI elements within the DUI ecosystem 302.

In some embodiments, the query result may provide two or more DUI elements that are compatible with one another. The compatible DUI elements may be linked together enabling assembly of a control panel to achieve the target workflow. In further embodiments, the DUI elements provided by the query result may be associated with applications that are not DUI capable. In response, a secondary service and/or a program may be applied to provide DUI capabilities to the applications that are not DUI capable.

In other embodiments, the DUI identification system 314 may also receive the other controls 310 within the DUI ecosystem 302 associated with the target workflow from the requesting client through the search application executed by the servers. For example, the other controls 310 may be a source application and a final application within the target workflow. A query 328 may be executed on the searchable knowledge sources 320, 322, 324 by the query engine 326 through the search application. The query terms may be based on the other controls 310 as input elements associated with the target workflow. The query engine 326 may accept as an input element the identity of a control that the client needs to use in the target workflow because the output of one element may be the input of another element within the target workflow. Identification of workflow paths the user is not aware of may also be enabled. For example, if the client is a smart phone and a workflow from a camera application is intended to be used for an edge finding DUI element, the client may indicate the camera application as the input control. The query engine 326 may then execute a query on the searchable knowledge sources 320, 322, 324 for various output controls of the camera application such as a clipboard, a file system, a data exchange service, or a similar output control. The alternate embodiment for clients to provide other controls 310 to the DUI identification system 314, may enable users with limited technical expertise to determine which data formats of input elements or output elements are available to successfully receive a query result from the query engine 326.

In an example scenario, a user may want a photo function on their mobile device that is not offered by any existing application. For example, a travel agency marketing person may want to add logos and/or captions in simulated threedimensional (3D) rendered letters that follow prominent edge paths to generate a series of travel photos with branding that looks like the letters have been placed physically in the environment. The user's mobile device may be able to capture the pictures, an image processing program may recognize edge paths, and a graphics program may insert captions along arbitrary curves.

The DUI identification system 314 may receive from the user's mobile device keywords, such as "edge recognize," "edge filter," or "path extraction," and an input element, such as a camera source application through the search application executed by the servers. If the travel agency developer hosts the graphics program on their website, for example, the user may also provide the graphics program as an output element to the DUI identification system 314. The query engine 326 may then execute a query on the searchable knowledge sources 320, 322, 324 through the search application for the keywords with the various types of input elements and output elements specified by the user. The search application may then provide a list of possible DUI elements from the query engine 326 to the user's mobile device. Some of the am elements may be dependent on the mobile device having specific software executing on a desktop to export a control, while others may be available as web applications of various sorts or standalone open source applications. The user may select one or more of the DUI elements that may enable their target workflow to be achieved and assemble together the appropriate components within a control panel, for example, with the final output going to the mobile device "share to" intent.

Accordingly, anytime the user takes a photo, they may be enabled to grab the photo and find edges. They may then erase some of the edges on the mobile device and/or add their branding caption text into the photo along the resulting edges. The modified photo may then be shared with a third party social networking site. Assembling such a workflow may enable a client to quickly perform a series of steps on their mobile device that may normally take multiple discrete programs and specialized skills at a desktop. An arbitrary number of workflows may be assembled into small widget groups of associated DUI elements once such functions can be identified.

The examples in FIGS. 1 through 3 have been described using specific DUI systems and processes to identify DUI elements through development and implementation of a searchable knowledge source. Embodiments to identify DUI elements are not limited to the specific DUI systems and processes according to these examples.

Figure 4:
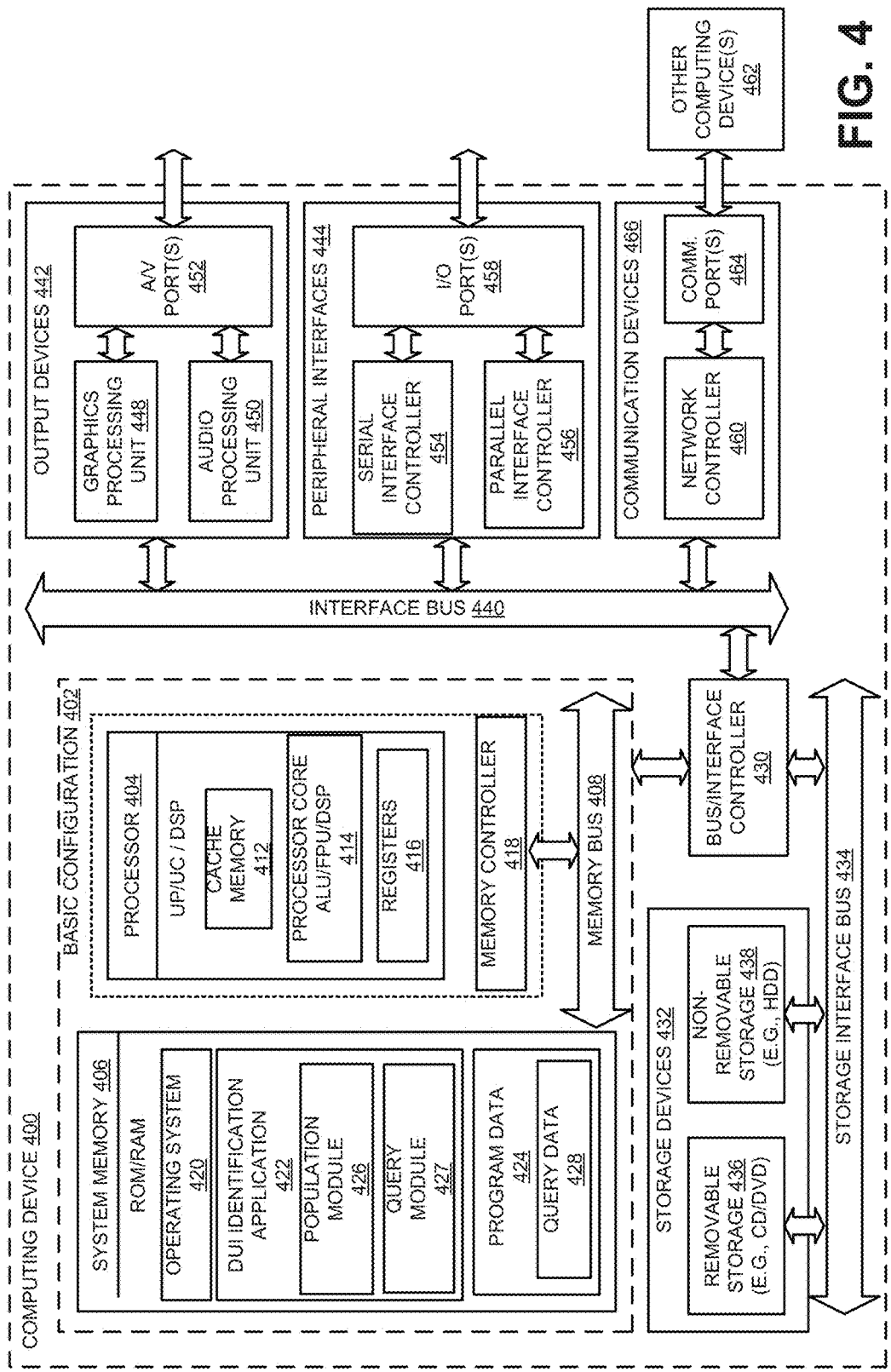
FIG. 4 illustrates a general purpose computing device, which may be used to develop and implement a searchable knowledge source to identify DUI elements.

FIG. 4 illustrates a general purpose computing device, which may be used to which may be used to develop and implement a searchable knowledge source to identify DUI elements, arranged in accordance with at least some embodiments described herein.

For example, the computing device 400 may be used to implement a searchable knowledge source to identify DUI elements, as described herein. In an example basic configuration 402, the computing device 400 may include one or more processors 404 and a system memory 406. A memory bus 408 may be used for communicating between the processor 404 and the system memory 406. The basic configuration 402 is illustrated in FIG. 4 by those components within the inner dashed line.

Depending on the desired configuration, the processor 404 may be of any type, including but not limited to a microprocessor (μP), a microcontroller (μC), a digital signal processor (DSP), or any combination thereof. The processor 404 may include one more levels of caching, such as a level cache memory 412, one or more processor cores 414, and registers 416. The example processor cores 414 may (each) include an arithmetic logic unit (ALU), a floating point unit (FPU), a digital signal processing core (DSP Core), or any combination thereof. An example memory controller 418 may also be used with the processor 404, or in some implementations, the memory controller 418 may be an internal part of the processor 404.

Depending on the desired configuration, the system memory 406 may be of any type including but not limited to volatile memory (such as RAM), non-volatile memory (such as ROM, flash memory, etc.) or any combination thereof. The system memory 406 may include an operating system 420, a DUI identification application 422, and program data 424. The DUI identification application 422 may include a population module 426 and a query module 427. The population module 426 may populate one or more searchable knowledge sources based on an application description associated with a source application. The application description may be retrieved from a control record, the application description including keyword, input elements, and output elements. The query module 427 may execute a query on the searchable knowledge sources with query terms based on keywords, input elements, and output elements received by a DUI identification system from a requesting client. The program data 424 may include, among other data, query data 428 related to a query result produced by the query module 427, as described herein.

The computing device 400 may have additional features or functionality, and additional interfaces to facilitate communications between the basic configuration 402 and any desired devices and interfaces. For example, a bus/interface controller 430 may be used to facilitate communications between the basic configuration 402 and one or more data storage devices 432 via a storage interface bus 434. The data storage devices 432 may be one or more removable storage devices 436, one or more non-removable storage devices 438, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 406, the removable storage devices 436 and the non-removable storage devices 438 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 400. Any such computer storage media may be part of the computing device 400.

The computing device 400 may also include an interface bus 440 for facilitating communication from various interface devices (for example one or more output devices 442, one or more peripheral interfaces 444, and one or more communication devices 466) to the basic configuration 402 via the bus/interface controller 430. Some of the example output devices 442 include a graphics processing unit 448 and an audio processing unit 450, which may be configured to communicate to various external devices such as a display or speakers via one or more A/V ports 452. One or more example peripheral interfaces 444 may include a serial interface controller 454 or a parallel interface controller 456, which may be configured to communicate with external devices such as input devices (for example, keyboard, mouse, pen, voice input device, touch input device, etc.) or other peripheral devices (for example, printer, scanner, etc.) via one or more I/O ports 458. An example communication device 466 includes a network controller 460, which may be arranged to facilitate communications with one or more other computing devices 462 over a network communication link via one or more communication ports 464. The one or more other computing devices 462 may include servers, client devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 400 may be implemented as a part of a general purpose or specialized server, mainframe, or similar computer that includes any of the above functions. The computing device 400 may also be implemented as a personal computer including both laptop computer and non-laptop computer configurations.

Example embodiments may also include methods to develop a searchable knowledge source to identify DUI elements. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 5:
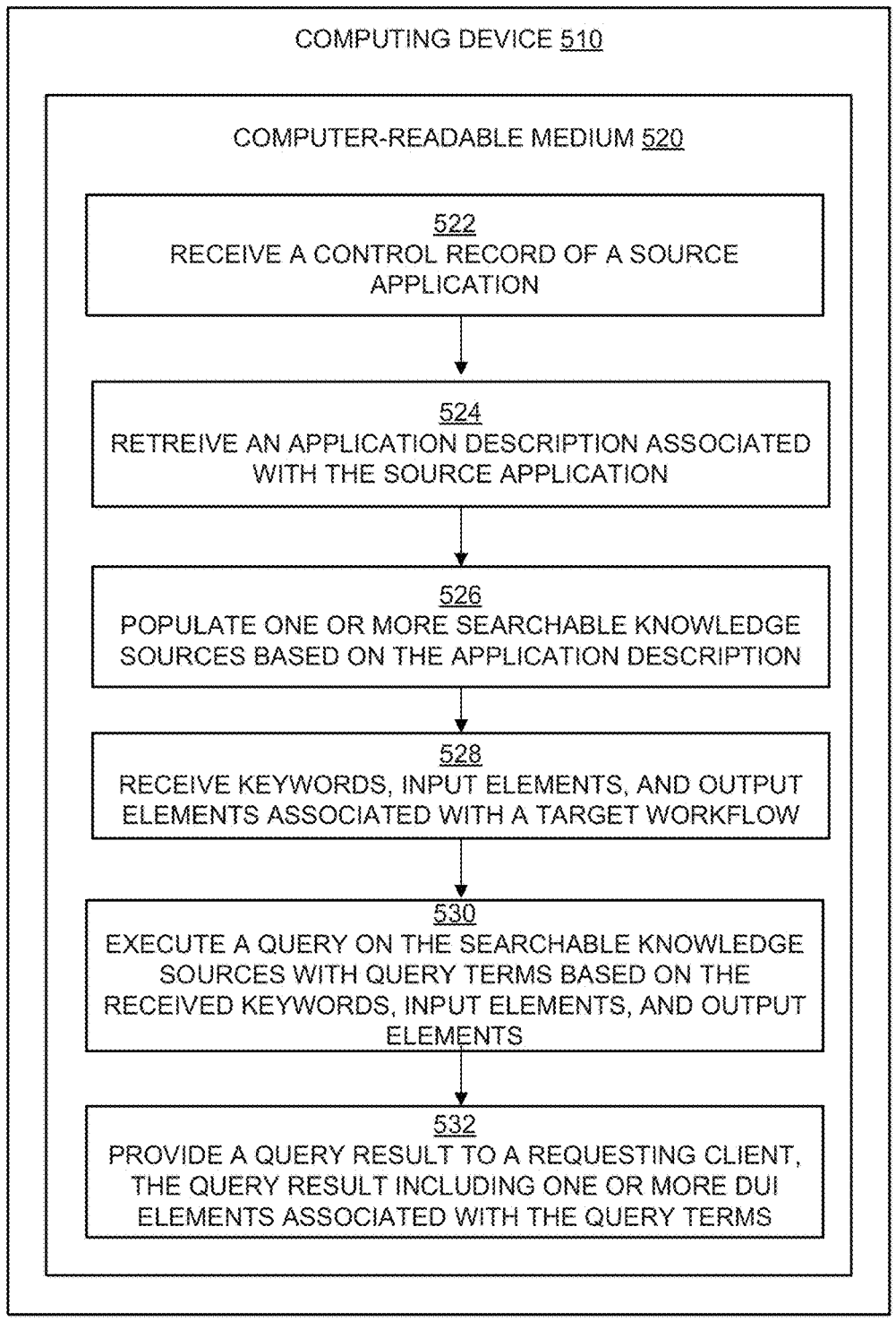
FIG. 5 is a flow diagram illustrating an example method to develop and implement a searchable knowledge source to identify DUI elements that may be performed by a computing device such as the computing device in FIG. 4.

FIG. 5 is a flow diagram illustrating an example method to develop and implement a searchable knowledge source to identify DUI elements that may be performed by a computing device such as the computing device in FIG. 4, arranged in accordance with at least some embodiments described herein.

Example methods may include one or more operations, functions or actions as illustrated by one or more of blocks 522, 524, 526, 528, 530, and 532. The operations described in the blocks 522 through 532 may also be stored as computer-executable instructions in a computer-readable medium such as a computer-readable medium 520 of a computing device 510.

An example process to develop and implement a searchable knowledge source to identify DUI elements may begin with block 522, "RECEIVE A CONTROL RECORD OF A SOURCE APPLICATION," where a DUI identification system (for example, the DUI identification system 314) may receive a control record (for example, the control record 316) of a source application (for example, the source application 304) from a DUI ecosystem (for example, the DUI ecosystem 302) through a knowledge source application executed by one or more servers of the DUI identification system. A monitor (for example, the monitor 312) within the am ecosystem may be configured to observe control information associated with the source application to provide data for the control record. The monitor may be located in a DUI system (for example, the DUI system 306), the source application, or a served control (for example, the served control 308).

Block 522 may be followed by block 524, "RETRIEVE AN APPLICATION DESCRIPTION ASSOCIATED WITH THE SOURCE APPLICATION," where the knowledge source application may retrieve an application description associated with the source application. The application description may be retrieved by submitting a query to a search engine, accessing files on a device hosting the source application, and/or performing other text search techniques. The application description may include keywords, input elements, and output elements associated with the source application.

Block 524 may be followed by block 526, "POPULATE ONE OR MORE SEARCHABLE KNOWLEDGE SOURCES BASED ON THE APPLICATION DESCRIPTION," where the knowledge source application may populate one or more searchable knowledge sources (for example, the searchable knowledge sources 320, 322, 324) based on the application description. The searchable knowledge sources may be further developed from control records of a multitude of source applications.

Block 526 may be followed by block 528, "RECEIVE KEYWORDS, INPUT ELEMENTS, AND OUTPUT ELEMENTS ASSOCIATED WITH A TARGET WORKFLOW," where the servers of the DUI identification system may execute a search application to receive keywords, input elements, and output elements associated with a target workflow from a requesting client.

Block 528 may be followed by block 530, "EXECUTE A QUERY ON THE SEARCHABLE KNOWLEDGE SOURCES WITH QUERY TERMS BASED ON THE RECEIVED KEYWORDS, INPUT ELEMENTS, AND OUTPUT ELEMENTS," where the query engine (for example, the query engine 326) of the DUI identification system may execute a query (for example, the query 328) on the searchable knowledge sources through the search application. Query terms may be based on the received keywords, input elements, and output elements associated with the target workflow.

Block 530 may be followed by block 532, "PROVIDE A QUERY RESULT TO A REQUESTING CLIENT, THE QUERY RESULT INCLUDING ONE OR MORE DUI ELEMENTS ASSOCIATED WITH THE QUERY TERMS," where the search application may provide a query result to the requesting client. The query result may include one or more DUI elements associated with the query terms, where the DUI elements may connect the input elements to corresponding output elements and match keywords associated with the target workflow. In other embodiments, the query result may provide two or more DUI elements that are compatible with one another and may be linked together to enable the client to assemble a control panel to achieve the target workflow.

The blocks included in the above described process are for illustration purposes. Identification of DUI elements through development and implementation of searchable knowledge sources may be implemented by similar processes with fewer or additional blocks. In some embodiments, the blocks may be performed in a different order. In some other embodiments, various blocks may be eliminated. In still other embodiments, various blocks may be divided into additional blocks, or combined together into fewer blocks.

FIG. 6 illustrates a block diagram of an example computer program product, arranged in accordance with at least some embodiments described herein.

In some embodiments, as shown in FIG. 6, the computer program product 600 may include a signal bearing medium 602 that may also include one or more machine readable instructions 604 that, when executed by, for example, a processor, may provide the functionality described herein. Thus, for example, referring to the processor 404 in FIG. 4, a population module 426 and a query module 427 executed on the processor 404 may undertake one or more of the tasks shown in FIG. 6 in response to the instructions 604 conveyed to the processor 404 by the medium 602 to perform actions associated with establishing secure communications to manage components of a control system as described herein. Some of those instructions may include, for example, instructions for receiving a control record of a source application, retrieving an application description associated with the source application, populating one or more searchable knowledge sources based on the application description, receiving keywords, input elements, and output elements associated with a target workflow, executing a query on the searchable knowledge source with query terms based on the keywords, the input elements, and the output elements, and providing a query result to a requesting client, the query result including one or more DUI elements associated with the query terms, according to some embodiments described herein.

In some implementations, the signal bearing medium 602 depicted in FIG. 6 may encompass a computer-readable medium 606, such as, but not limited to, a hard disk drive, a solid state drive, a Compact Disc (CD), a Digital Versatile Disk (DVD), a digital tape, memory, etc. In some implementations, the signal bearing medium 602 may encompass a recordable medium 608, such as, but not limited to, memory, read/write (R/W) CDs, R/W DVDs, etc. In some implementations, the signal bearing medium 602 may encompass a communications medium 610, such as, hut not limited to, a digital and/or an analog communication medium (for example, a fiber optic cable, a waveguide, a wired communications link, a wireless communication link, etc.). Thus, for example, the program product 600 may be conveyed to one or more modules of the processor 404 of FIG. 4 by an RF signal bearing medium, where the signal bearing medium 602 is conveyed by the wireless communications medium 610 (for example a wireless communications medium conforming with the IEEE 802.11 standard).

According to some examples, a method to develop a searchable knowledge source for identification of distributed user interface (DUI) elements is provided. An example method may include receiving a control record of a source application and retrieving an application description associated with the source application. The method may further include populating one or more searchable knowledge sources based on the application description.

In other examples, the control record of the source application may include an identity of the source application and control information associated with the source application. The control record of the source application may be received from a monitor, where the monitor may be located in one of a DUI system, the source application, and a served control. The monitor may be configured to observe control information associated with the source application to provide data for the control record. A query may be submitted to a search engine to retrieve the application description. Data may be accessed on a device hosting the source application to retrieve the application description.

In further examples, the one or more searchable knowledge sources may be populated with keywords, input elements, and output elements obtained from the application description associated with the source application, where the searchable knowledge sources are a database or a data cube. The control record of the source application may be provided to a DUI system, the control record including implementation information for client use of the DUI system.

According to some embodiments, a method to identify distributed user interface (DUI) elements through a searchable knowledge source is provided. An example method may include receiving keywords, input elements, and output elements associated with a target workflow. The method may also include executing a query on the searchable knowledge source with query terms based on the received keywords, input elements, and output elements, where the searchable knowledge source may be generated from control records of a plurality of applications. The method may further include providing a query result to a requesting client, the query result including one or more DUI elements associated with the query terms.

In other embodiments, the query result may further include one or more DUI elements that connect one or more input elements to corresponding one or more output elements and match one or more keywords associated with the target workflow. In response to a selection of one or more DUI elements from the query result to implement, information to implement the one or more selected DUI elements is provided or the one or more selected DUI elements are automatically implemented within a DUI system.

In further embodiments, a query result may provide two or more DUI elements that are compatible with one another. The two or more compatible DUI elements may be linked together enabling assembly of a control panel to achieve the target workflow from the compatible DUI elements. The searchable knowledge source may be a database or a data cube.

According to some examples, a server to develop a searchable knowledge source for identification of distributed user interface (DUI) elements is described. An example server may include a memory and a processor coupled to the memory, the processor executing a knowledge source application. The knowledge source application may be configured to receive a control record of a source application and retrieve an application description associated with the source application. The knowledge source application may also be configured to populate one or more searchable knowledge sources with keywords, input elements, and output elements obtained from the application description associated with the source application.

In other examples, the source application may include a desktop application, a web page element, a web application, a ubiquitous computing (ubicomp) device service, or a user interface element that is isolated by a DUI system. The DUI system may be browser based, operating system (OS) based, and/or a specific DUI application that is activated to access one or more DUI elements. The control record of the source application may include an identity of the source application and control information associated with the source application, where the control information associated with the source application includes a description of how controls connect as producers, consumers, adopters, and developers to implement application control serving. The control record of the source application may further include icon targets in the source application and command formatting. The control record of the source application may be received from a monitor, where the monitor may be located in a DUI system, the source application, or a served control. The monitor may be configured to observe control information associated with the source application to provide data for the control record.

In further examples, the knowledge source application may be configured to retrieve the application description through a search engine and/or data accessed on a device hosting the source application. The input elements may be first interface elements from a first source application that are delivered to second interface elements to produce the output elements on one of the first source application and a second source application. The input elements and the output elements may specify a data format, where the data format may include a media stream, an XML, a URL, a jpeg, a graphical format, text, HTML, tuple and/or one or more controls linked to a served control. The knowledge source application may be further configured to provide the control record of the source application to a DUI system, the control record including implementation information for use of the DUI system.

According to some embodiments, a server to identify distributed user interface (DUI) elements through a searchable knowledge source is described. An example server may include a memory and a processor coupled to the memory, the processor executing a search application. The search application may be configured to receive keywords, input elements, and output elements associated with a target workflow. The search application may also be configured to execute a query on the searchable knowledge source with query terms based on the received keywords, input elements, and output elements, where the searchable knowledge source may be generated from control records of a plurality of applications. The search application may be further configured to provide a query result to a requesting client, the query result including one or more DUI elements associated with the query terms.

In other embodiments, the query result may further include one or more DUI elements that connect one or more input elements to corresponding one or more output elements and match one or more keywords associated with the target workflow. The input elements may be first interface elements from a first source application that are delivered to second interface elements to produce the output elements on one of the first source application and a second source application. The input elements and the output elements may specify a data format, where the data format may include a media stream, an XML, a URL, a jpeg, a graphical format, text, HTML, a tuple and/or one or more controls linked to a served control. In response to a selection of one or more DUI elements from the query result to implement, the search application may be configured to provide information to the client to implement the one or more selected DUI elements or the search application may be configured to enable automatic implementation of the one or more selected DUI elements within a DUI system.

In further embodiments, the query result may further provide two or more DUI elements that are compatible with one another, where the search application may be configured to link the two or more compatible DUI elements together. The search application may also be configured to enable assembly of a control panel to achieve the target workflow from the two or more compatible DUI elements. The DUI elements provided by the query result may be associated with web applications, open source applications, or device software. The DUI elements provided by the query result may also be associated with applications that are not DUI capable, where a secondary service or a program may be applied to provide DUI capabilities to the applications that are not DUI capable.

According to other examples, a computer-readable memory device with instructions stored thereon is described, which when executed on one or more computing devices may execute a method to develop a searchable knowledge source implemented to identify distributed user interface (DUI) elements. The method may be similar to the example method to develop a searchable knowledge source implemented to identify distributed user interface (DUI) elements discussed above.

According to other embodiments, a computer-readable memory device with instructions stored thereon is described, which when executed on one or more computing devices may execute a method to identify distributed user interface (DUI) elements through implementation of a searchable knowledge source. The method may be similar to the example method to identify distributed user interface (DUI) elements through implementation of a searchable knowledge source as discussed above.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (for example, hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various examples of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (for example as one or more programs running on one or more computer systems), as one or more programs running on one or more processors (for example, as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular examples described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or analog communication medium (for example a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors.

A typical data processing system may be implemented utilizing any suitable commercially available components, such as those typically found in systems employing searchable knowledge sources to identify DUI elements. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected," or "operably coupled," to each other to achieve the desired functionality, and any two components capable of being so associated may also be viewed as being "operably couplable," to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to develop a searchable knowledge source for identification of distributed user interface (DUI) elements, the method comprising:
   receiving user input from a device associated with a user, wherein the user input describes application functions that are not offered by a source application;
   receiving a control record of the source application from a monitor, wherein the control record of the source application comprises an identity of the source application and control information associated with the source application, and wherein the monitor is located in one of: a DUI system, the source application, and a served control;
   retrieving, based on the control record, an application description associated with the source application;
   populating a data store with keywords, input elements, and output elements obtained from the application description associated with the source application;
   providing a list of DUI elements to the user that, when selected, provide corresponding application functions that were not previously offered by the source application; and
   responsive to receiving a selection of a DUI element from the list, providing a corresponding application function that was not previously offered by the source application,
   wherein the source application includes a photography application, wherein the application functions are photography functions that are not offered by the source application, and wherein the list of DUI elements is a list of photography functions.

2. The method of claim 1, further comprising:
   providing the control record of the source application to the DUI system, wherein the control record comprises implementation information for client use of the DUI system.

3. The method of claim 1, wherein the application functions that are not offered by the source application further include an option to add text to an original image, and wherein providing the corresponding application function includes providing a modified image that includes the text.

4. The method of claim 3, further comprising providing a first option to share, with a social network, the modified image that includes the text or a second option to email the modified image that includes the text.

5. A first server to develop a searchable knowledge source for identification of distributed user interface (DUI) elements, the first server comprising:
   a memory; and
   a processor coupled to the memory, wherein the processor is configured to execute a knowledge source application stored in the memory, and wherein the knowledge source application is configured to:
   receive user input from a device associated with a user, wherein the user input describes application functions that are not offered by a source application;
   receive a control record of the source application from a monitor, wherein the control record of the source application comprises an identity of the source application and control information associated with the source application, wherein the monitor is configured to observe the control information associated with the source application to provide data for the control record, and wherein the control information associated with the source application includes a description of a manner in which controls connect as producers, consumers, adopters, and developers to implement application control serving;
   retrieve an application description associated with the source application based on the control record;
   populate a data store with keywords, input elements, and output elements obtained from the application description associated with the source application;
   provide a list of DUI elements to the user; and
   responsive to receiving a selection of a DUI element from the list, providing a corresponding application function that was not previously offered by the source application.

6. The first server of claim 5, wherein the control record of the source application comprises icon targets in the source application and command formatting.

7. The first server of claim 5, wherein the knowledge source application is further configured to:
   identify an application name or a file name from the control record; and
   submit a query to a search engine that is stored on a second server that is separate from the source application, wherein the query includes the application name or the file name,
   wherein the application description associated with the source application is retrieved from the second server.

8. The first server of claim 5, wherein the input elements include first interface elements from a first source application that are delivered to second interface elements to produce the output elements on one of the first source application and a second source application.

9. The first server of claim 5, wherein the knowledge source application is further configured to provide the control record of the source application to a DUI system, and wherein the control record comprises implementation information for use of the DUI system.

10. A server to identify distributed user interface (DUI) elements through a searchable knowledge source, the server comprising:
    a memory; and
    a processor coupled to the memory, wherein the processor executes a search application stored in the memory, and wherein the search application is configured to:

receive keywords, input elements, and output elements associated with a target workflow, wherein the keywords, the input elements, and the output elements were derived from user input that describes application functions that are not offered by a source application;

execute a query on the searchable knowledge source with query terms based on the received keywords, input elements, and output elements, wherein the searchable knowledge source is generated from control records of a plurality of applications, and wherein the control records are received from a monitor configured to observe control information associated with a source application;

provide a query result to a requester client, wherein the query result comprises a plurality of DUI elements associated with the query terms;

in response to a selection, from the requester client, of two or more DUI elements from the plurality of DUI elements provided in the query result, provide information to the requester client to enable implementation of the selected two or more DUI elements; and enable assembly of a control panel to achieve the target workflow from the selected two or more DUI elements, wherein the control panel links the selected two or more DUI elements to enable a sequence of one or more actions to be performed within the target workflow, and wherein the two or more DUI elements, upon selection, provide corresponding application functions that were not previously offered by the source application.

11. The server of claim 10, wherein the query result comprises the plurality of DUI elements, which connect a plurality of input elements of the received input elements to a corresponding plurality of output elements of the received output elements, and match one or more of the keywords associated with the target workflow.

12. The server of claim 10, wherein the input elements include first interface elements from a first source application that are delivered to second interface elements to produce the output elements on one of the first source application and a second source application.

13. The server of claim 10, wherein the query result provides the plurality of DUI elements which are compatible with one another.

14. The server of claim 10, wherein the plurality of DUI elements provided by the query result are associated with applications that are not DUI capable.

15. The server of claim 14, wherein one of a secondary service and a program is applied to provide DUI capabilities to the applications that are not DUI capable.

* * * * *